Nov. 8, 1966  J. S. BEST  3,284,260
METHOD OF MAKING A COMPOSITE SHAPED ARTICLE
Filed Feb. 28, 1966

INVENTOR.
John S. Best
BY
Robert B. Ingraham
AGENT

United States Patent Office 3,284,260
Patented Nov. 8, 1966

3,284,260
METHOD OF MAKING A COMPOSITE SHAPED ARTICLE
John S. Best, Midland, Mich., assignor to The Dow Chemical Company, Midland, Mich., a corporation of Delaware
Filed Feb. 28, 1966, Ser. No. 538,497
6 Claims. (Cl. 156—212)

This application is a continuation-in-part of my copending application Serial No. 151,354 filed November 9, 1961, and now abandoned.

This invention relates to a method of forming a curved composite sheet. It more particularly relates to forming a composite sheet embodying a reinforcing mesh and a generally cellular sheet.

A number of composite cellular or sponge-like sheets are presently commercially available. These, in general, may be classified into two general categories, those which are rigid and those which are flexible. The flexible sheets are generally typified by sponge rubber and the more rigid sheets by polystyrene and various composition boards such as are readily prepared from combinations of fibrous fillers and plastic resins such as wood chips in combination with foamable particulate polystyrene and the like. Frequently, it is desirable to form such sheets into curved configurations. With the flexible sheets this presents no problem, but however, they will not retain their form. With the rigid sheets, the problem is more difficult. An attempt to form them beyond a minimum amount results in rupture of the sheet and substantial loss of utility.

It would be advantageous to have available a formable sheet composed of a rigid cellular material and a reinforcing agent.

It would be further advantageous if such a sheet were formable both into simple and compound curves; (by a compound curve is meant a curve which is other than a curve generated by a line moving parallel to itself).

Further, it would be beneficial if such cellular sheets were formable and provided with a relatively strong abrasion and impact resistance surface.

These benefits and other advantages are readily achieved in accordance with the invention by providing a formable sheet comprising a rigid cellular layer having adjacent at least one surface thereof a mesh adhered to the surface of the cellular layer by a resinous composition which, during its curing to a rigid form passes through a formable gel stage and bending the sheet to a curved configuration. The term gel stage, as contemplated by the present invention, refers to that stage of curing of a resinous composition wherein the material is apparently solid, but is flexible and can be formed by the application of external forces without rupture or fracture. Typically a thermosetting resin passes through these stages during curing, the A, B and C stages. The A stage of a resinous composition is that stage prior to a high degree of polymerization wherein the material is readily a liquid or semi-solid and readily soluble. The B stage is when the resin is relatively insoluble, fusible, and formable under heat and pressure. The C stage is the stage in which the resin is cross-linked, insoluble, and is no longer formable by the application of external force or heat. The term "gel stage," as used herein, refers to a degree of polymerization encompassing the latter part of the A stage and early portion of the B stage wherein the composition is not brittle, can be formed slowly at ambient or higher temperatures without cracking, that is, it exhibits plastic flow.

Further features and advantages of the invention are readily apparent in the following description when taken in conjunction with the drawing wherein.

Figure 1:
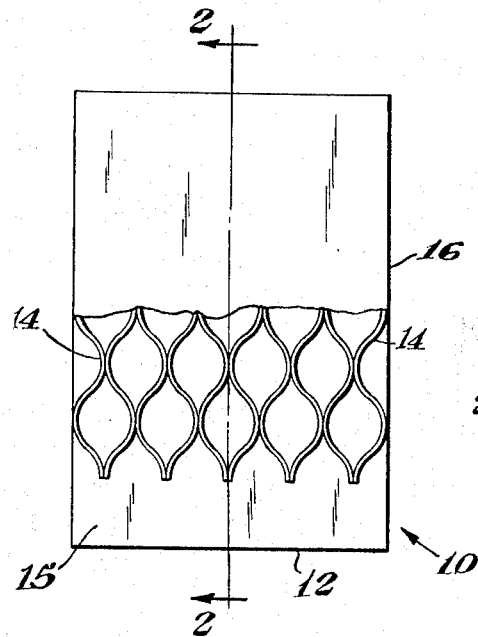
FIGURE 1 illustrates a sheet in accordance with the invention.

In FIGURE 1 there is illustrated a representation of a sheet in accordance with the invention generally designated by the reference numeral 10. The sheet 10 comprises a cellular substrate 12 having adjacent its surface 15 a portion of mesh 14 adhered to the surface 15 of the substrate 12 by a resinous composition 16 which passes through a gel stage. Alternately the mesh 14 can be embedded in the substrate 12 adjacent the surface and of the foam coated with resin.

Figure 2:
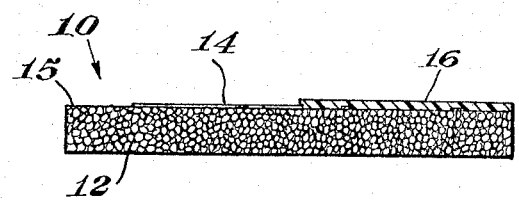
FIGURE 2 depicts a sectional view of the sheet of FIGURE 1.

FIGURE 2 is a cross-sectional representation of the sheet 10. FIGURE 1, taken along the line 2—2, showing the relative portion of the substrate 12, the surface 15 of the substrate 12, reinforcing mesh 14 and the resinous composition 16.

Figure 3:
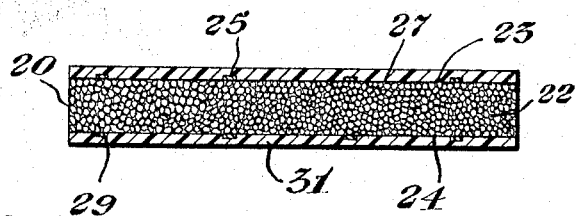
FIGURE 3 is a sectional view of an alternate embodiment of the invention.

FIGURE 3 depicts a sheet in accordance with the invention generally designated by the reference numeral 20. The sheet 20 comprises a substrate 22 having an upper surface 23 and a lower surface 24. Adjacent the upper surface 23 is a portion of expanded metal mesh 25 embedded in a resinous composition 27. Adjacent the surface 24 is a portion of expanded metal mesh 29 which is embedded and adhered to the surface 24 by the resinous composition 31. The embodiment of FIGURE 3 is formed by bending in either direction.

Figure 4:
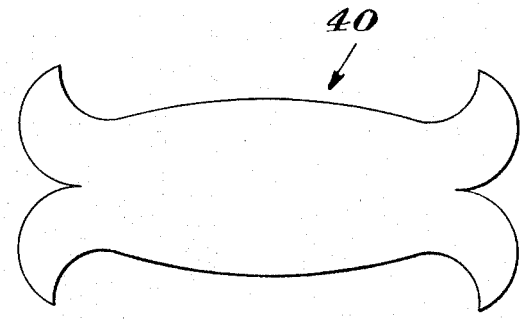
FIGURE 4 depicts a precut plank or sheet in accordance with the invention.

FIGURE 4 depicts a view of a sheet designated by the reference numeral 40 which has been cut to the shape of a flat development of a canoe. The expanded metal mesh is adjacent the lower surface and not shown in the drawing.

Figure 5:
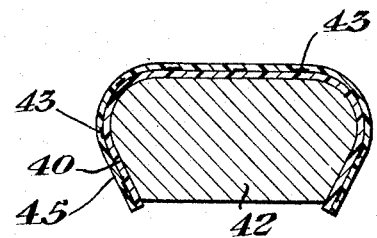
FIGURES 5, 6 and 7 illustrate various views of an object formed from the sheet of the invention.

FIGURE 5 depicts a sectional view of the sheet 40 when shaped over a form 42. The sheet 40 has on its outer surface a layer of expanded metal mesh 43 embedded in and adhered to the surface of sheet 40 by the resinous composition 45.

Figure 6:
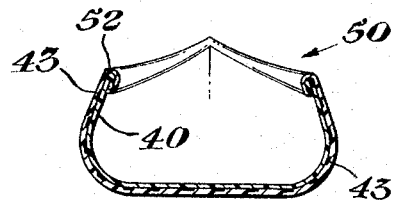

FIGURE 6 depicts an isometric view of a canoe 50 formed from a sheet 40 in accordance with the invention, and having an expanded metal mesh 43 embedded in and adhered to the outer surface of the sheet 40 by the resinous composition 45.

Figure 7:
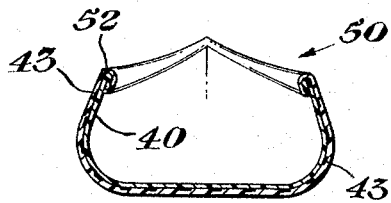

FIGURE 7 is a cross-sectional view of a canoe 50 taken along the lines 7—7 of FIGURE 6 illustrating in detail the formation of the gunwale portion 52 wherein the sheet 40 is formed therein 180° reverse bend and the reinforcing mesh 43 a 270° bend.

In the practice of the invention, a wide variety of substrates are employed. Typical are those prepared from rigid expanded plastics such as polystyrene foam, polyvinyl chloride foams, as well as rigid open cell foams. Generally, it is advantageous to employ a closed cell rather than open cell substrate in order that the binding resin will remain on the surface rather than be absorbed into the sheet. However, if the openings in the open cell sheet are sufficiently small and the viscosity of the resinous composition sufficiently high, no appreciable loss will occur. Certain composite boards, such as those formed from wood chips, and foam polystyrene, fine celled blast furnace slags, adhered with organic binders are equally useful. Generally, it is desirable the walls of cells of the material crush rather than fracture under compression. However, useful laminates are readily prepared from cellular materials in which fracture of the cell walls occurs when the laminate is bent.

A wide variety of resinous compositions may be employed to bind the reinforcing mesh to the surface of the composite board. The essential feature of the resin employed to bond the reinforcing mesh on the surface of the composite panel is that it should possess a gel stage of appreciable duration. Depending on the manufacturing conditions, a "gel stage" of from about 30 seconds to about 6 months or even longer is readily utilized. The existence of such a "gel stage" is predicated upon the normal working or storage temperatures.

Typical resinous compositions which are employed in the practice of the invention are the well known phenol formaldehyde resins, epoxy resins, polyester resins, rigid polyurethane resins, and the like. Suitable fillers, dyes, pigments, stabilizers, and the like are readily incorporated without detracting from the utility thereof. However, the particular formulations will be chosen depending upon the specific application for which the sheet is to be utilized and are chosen according to principle well known in the art. The resinous compositions are applied as liquids (A stage) or may be solvent deposited or heat laminated to the cellular substrate provided insufficient heat is employed to cure the resin to the C stage.

The reinforcing mesh employed in the fabrication of sheets of the present invention advantageously is metal, plastic, or some fabrics which are formable into a compound curved shape. Typical patterns which are acceptable are found in United States Letters Patents 2,290,486, 2,609,315, Design Patents 182,349, 182,350, and 182,943. The hexagonal honeycomb configuratiton is also suitable, as is the net weave or pattern which is frequently found in fishing nets, chicken wire, and the like.

In the practice of the invention, the composite sheet is formed by bending either with or without a form and restraining the sheet in the desired form until the resinous composition was hardened to a rigid solid such as is obtained in the B or C stages. Bending must be done with the mesh is positioned on the concave surfaces the rigid lar structure of the sheet to be crushed when bent. If the mesh is positioned no the concave surfaces the rigid cellular sheet will rupture. During bending the cellular sheet must be subjected, primarily, to compression force only. The sheet of FIGURE 3 having mesh on each side may be bent in either direction as mesh will always be on the convex side.

By way of further illustration, a canoe was constructed by forming a sheet of expanded polystyrene having a density of approximately 2 pounds per cubic foot to an outline substantially as shown in FIGURE 4. The polystyrene sheet had a thickness of about 2 inches. A sheet of conventional metal lath as is used for a plaster base in home construction was cut to a size to match the outline of the foam plastic blank. The metal lath was applied to one surface of the foam plastic blank and pressed firmly until sufficient deformation of the foam surface occurred to hold the lath in place. A liquid coating of epoxy form resin which had a gel stage of about 12 hours at a temperature of 75° was applied to the surface of the foam plastic sheet over the expanded metal mesh. The amount of resin applied to the surface of the sheet was sufficient to cover the mesh and give a relatively smooth surface. The resin was permitted to harden until the gel stage was reached, that is, a stage where the resin was no longer tacky and could be formed without cracking. The sheet with the expanded metal lath covered side outermost was then placed upon a frame having the general outline of the canoe. The sheet was then slowly forced to conform to the general outline defined by the framework. The end portions forming the bow and stern were secured together by means of a small strip of metal lath which penetrated the foam and interlocked with the already embedded lath and a second coat of resin applied to the strip. The canoe blank was then removed from the form and thwarts were temporarily installed to maintain the desired spacing from gunwale to gunwale. The edge positions of the canoe were then turned inwardly through about 180° to form a rounded reinforcing gunwale. The formed canoe was held at a temperature of about 75° F. for a period of 16 hours. The canoe was found to be a rigid structure. The outer surface was tough and solid, resistant to scratches and abrasion. Subsequent coating of the interior surface of the canoe with an epoxy resin composition yielded a serviceable, useful vessel which resisted the impact of rocks, stones, submerged trees, and similar shallow stream navagational hazards when used under normal conditions. The coating applied to the interior surface of the canoe was found desirable in order to prevent deformation of the foam by hard soled shoes, paddles, and camping equipment.

In a similar manner, other shaped articles are readily formed from sheets in accordance with the invention such as bath tubs, refrigerator shells, lavatories, water closets, tubs for automatic washers, boats, shower stalls, airplane fuselages, swimming pools, automobile bodies, mobile home shells, portable buildings, domes, building structures, etc., walls, roofs, and partitions.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. The method of fabricating a composite shaped article having curved surfaces comprising providing a generally flat rigid cellular sheet, disposing adjacent at least a major surface thereof a layer of expanded metal mesh, forming a coating on the surface of the sheet of a resin in a gel stage thereby providing a flat composite article of a cellular sheet, metal mesh and resin in a gel stage, bending the flat article to form a curved composite shaped article with the mesh adjacent the convex surface thereof and allowing the resin in the gel stage to cure beyond the gel stage.

2. The method of claim 1 wherein the cellular sheet is a plastic sheet.

3. The method of claim 1, wherein said sheet is an expanded rigid thermoplastic sheet.

4. The method of claim 1 wherein said mesh is applied to at least two major surfaces of said sheet.

5. The method of claim 1 wherein the metal mesh is pressed into the surface of the cellular sheet and subsequently forming the coating on the sheet.

6. The method of claim 1 wherein the cellular sheet is polystyrene.

No references cited.

ALEXANDER WYMAN, *Primary Examiner.*

W. J. VAN BALEN, *Assistant Examiner.*